United States Patent [19]

Linville

[11] 4,372,099
[45] Feb. 8, 1983

[54] METHOD OF PACKING POULTRY

[76] Inventor: Richard D. Linville, P.O. Box 7, Pleasant Valley, Iowa 52767

[21] Appl. No.: 227,142

[22] Filed: Jan. 21, 1981

[51] Int. Cl.³ .................... B65B 21/06; A22C 21/00
[52] U.S. Cl. ........................................ 53/415; 53/443; 17/11
[58] Field of Search ............... 17/11, 1 R, 45; 53/415, 53/443, 445, 473, 474

[56] References Cited

U.S. PATENT DOCUMENTS

| | | | |
|---|---|---|---|
| 3,481,746 | 12/1969 | Clemens et al. | 53/445 X |
| 3,872,966 | 3/1975 | Gordon et al. | 53/415 X |
| 3,983,679 | 10/1976 | Zemke | 53/415 X |
| 4,033,088 | 7/1977 | Markert | 53/473 |

Primary Examiner—Willie G. Abercrombie
Attorney, Agent, or Firm—Edmond T. Patnaude

[57] ABSTRACT

A system for processing poultry incorporates automatic weighing and sorting which drops a predetermined number of predetermined grades and sizes of birds at a selected packing station to provide a total weight within a predetermined weight tolerance.

3 Claims, 3 Drawing Figures

METHOD OF PACKING POULTRY

The present invention relates in general to the art of processing poultry on a commercial scale, and it relates in particular to a new and improved processing line including novel means for weighing, sorting and packing said poultry for shipment to end users.

BACKGROUND OF THE INVENTION

At the present time chickens and turkeys are commonly brought to a processing plant where they are butchered, defeathered, eviscerated, sorted and packaged for shipment in a chilled condition. More particularly, the birds are delivered in cages or coops to the plants by the growers, and in an automated plant the birds are manually removed from the coops and individually hung by the feet on a traveling conveyor which carries them through a series of processing stations. Typically, the birds are carried by this first conveyor through a stunning station, a killing station and a defeathering or picking station. The birds are then transferred to a second conveyor which carries them through an eviscerating station, where the birds are eviscerated, before delivering them to a chiller. Ordinarily, imperfect or damaged parts are removed from the birds before they are placed in the chiller or when removed from it. The birds remain in the chiller until the temperature thereof has stabilized at about 40° F.

After being chilled, the birds are classified as to physical condition and placed on a third conveyor which carries them through one or more weighing stations and drops them according to size and grade at respective ones of a plurality of packing stations. At the packing stations the packers fill customer orders by selecting the desired number of a particular size and grade of bird and packing them in a box. The box is then weighed and if the total weight is too high or too low, the packer exchanges some of the packed birds for lighter or heavier ones as the situation requires.

By way of example, a typical customer specification might be fifty boxes each containing twenty-five grade A birds weighing between two and one-half or two and three-quarter pounds each and weighing a total of sixty-five pounds. The person doing the packing places a box on a scale and places in it twenty-five birds within the desired weight and grade range. The box may weigh anywhere between say sixty-two and sixty-eight pounds. The operator then substitutes smaller or larger birds within the desired weight range until the total weight is within a specified range of sixty-five pounds. The procedure is not only time consuming but generally results in substantially overweight boxes.

The sorting and packing operation is further complicated by the fact that the birds pick up a substantial amount of moisture during processing, and this moisture will be present at the weighing and packing station but will have evaporated by the time the birds reach the customer. This moisture thus constitutes a tare which must be predetermined and added to the weights of the individual birds and to the final boxes at the time of sorting and packing. Inasmuch as most of the moisture is picked up during chilling where the birds are usually immersed in cold water, the tare has generally been determined by periodically weighing a number of randomly selected birds before and after weighing and assuming that the average moisture pick-up of the selected birds is the same as the moisture pick-up for all of the birds being processed. The persons packing the boxes are thus required to make mental calculations of these tares and to subtract them from the weights appearing on the scales.

Most of the operations are thus carried out by persons who may or may not be highly efficient wherefor it is difficult to control unnecessary losses in such systems. This is of particular concern during the eviscerating process and during the final packing and weighing operations by which the billings are made. Moreover, it would be desirable to know the sizes of the live birds entering the plant so as to predetermine what sizes of birds will subsequently arrive at the packing station and which orders can be filled. This latter information is also useful in evaluating the growers who supply poultry to the plant.

SUMMARY OF THE INVENTION

Briefly, there is provided in accordance with the present invention new and improved processing apparatus which provides more accurate weight control throughout the entire process to minimize the possibility of human error in sorting and packing and to provide more information concerning the birds entering the plant and the condition of each bird during the overall processing operation. This novel apparatus incorporates a number of weighing stations positioned at different strategic locations in the processing system and connected to a central processor which also receives information from automatic sensors and other sources throughout the plant. At the packing station, drop stations and label printers are controlled by the central processor to drop the requisite poultry to the customer's specifications whereby the packers simply place each batch of dropped birds in a box and affix an automatically or preprinted label on the box. The packers are not required to weigh the packed box nor to calculate the tare. Moreover they need not count the number of birds placed in each box nor print the labels.

Preferably the birds are weighed before and after eviscerating to determine if the eviscerating operation is being conducted efficiently and also to provide a record of the weights of the birds delivered by each particular grower. Moreover, the coops are weighed before and after unloading and these weights are compared to the weights of the birds initially placed on the conveyor to provide a record of the number of dead birds contained in the coops as delivered.

The apparatus of the present invention thus provides a system for efficiently processing and packing poultry products and which enables the control of the various processing operations to maximize the quality of the final product and to minimize the processing and packing cost. Other novel features and advantages are incorporated in the system and are described hereinafter.

GENERAL DESCRIPTION OF THE DRAWING

The present invention will be better understood by a reading of the following detailed description taken in connection with the accompanying drawing wherein.

DETAILED DESCRIPTION OF THE INVENTION

Figure 1:
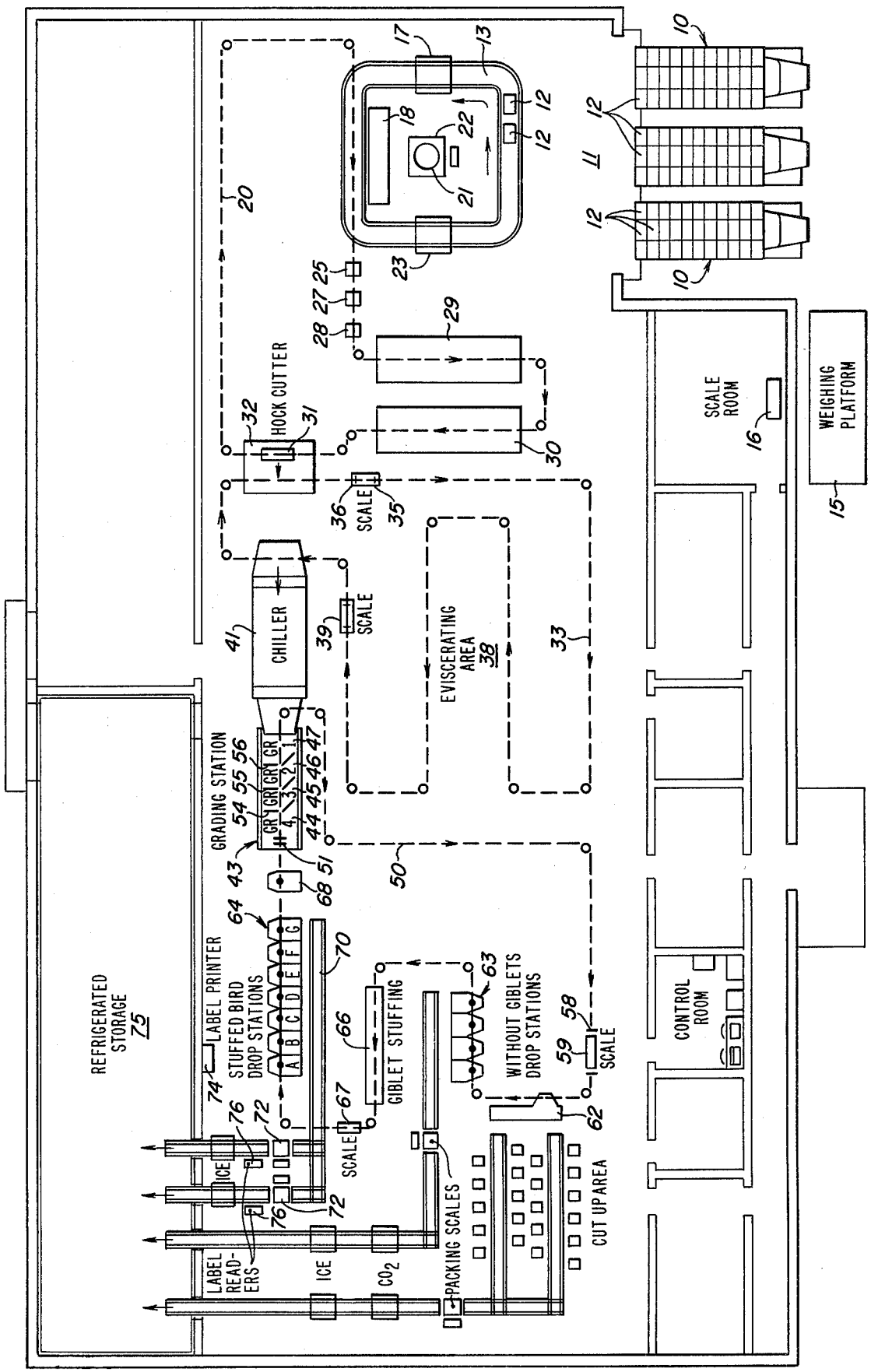
FIG. 1 is a flow chart showing a poultry processing system embodying the present invention.

Referring to FIG. 1 wherein is shown a poultry processing plant embodying several novel aspects of the present invention, a plurality of trucks 10 are shown parked at an unloading dock 11 where the poultry delivered in a plurality of coops 12 are unloaded from the trucks and placed on a conveyor 13. The coops 12 each contain a number of birds and are carried in a counterclockwise direction by the conveyor 13. The coops 12 thus pass over a weighing scale 17 along the conveyor 13 before arriving at a hanging station 18 where the birds are manually removed from the coops 12 and hung by their feet on shackles suspended from an overhead conveyor 20. Ordinarily these shackles are connected together.

On some occasions one or more of the birds are dead when the coops arrive at the processing plant, and these dead birds are also removed from the coops 12 at the hanging station 18, but unlike the live birds, they are placed in a tube 21 which rests on a weighing scale 22. The emptied coops 12 pass across another weighing scale 23 before returning to the loading dock 11 from which they are returned to one of the trucks 10. In a preferred embodiment of this invention the trucks 10 are weighed both before and after unloading by means of an outdoor weighing platform 15 and associated scale 16 located inside the plant.

Figure 2:
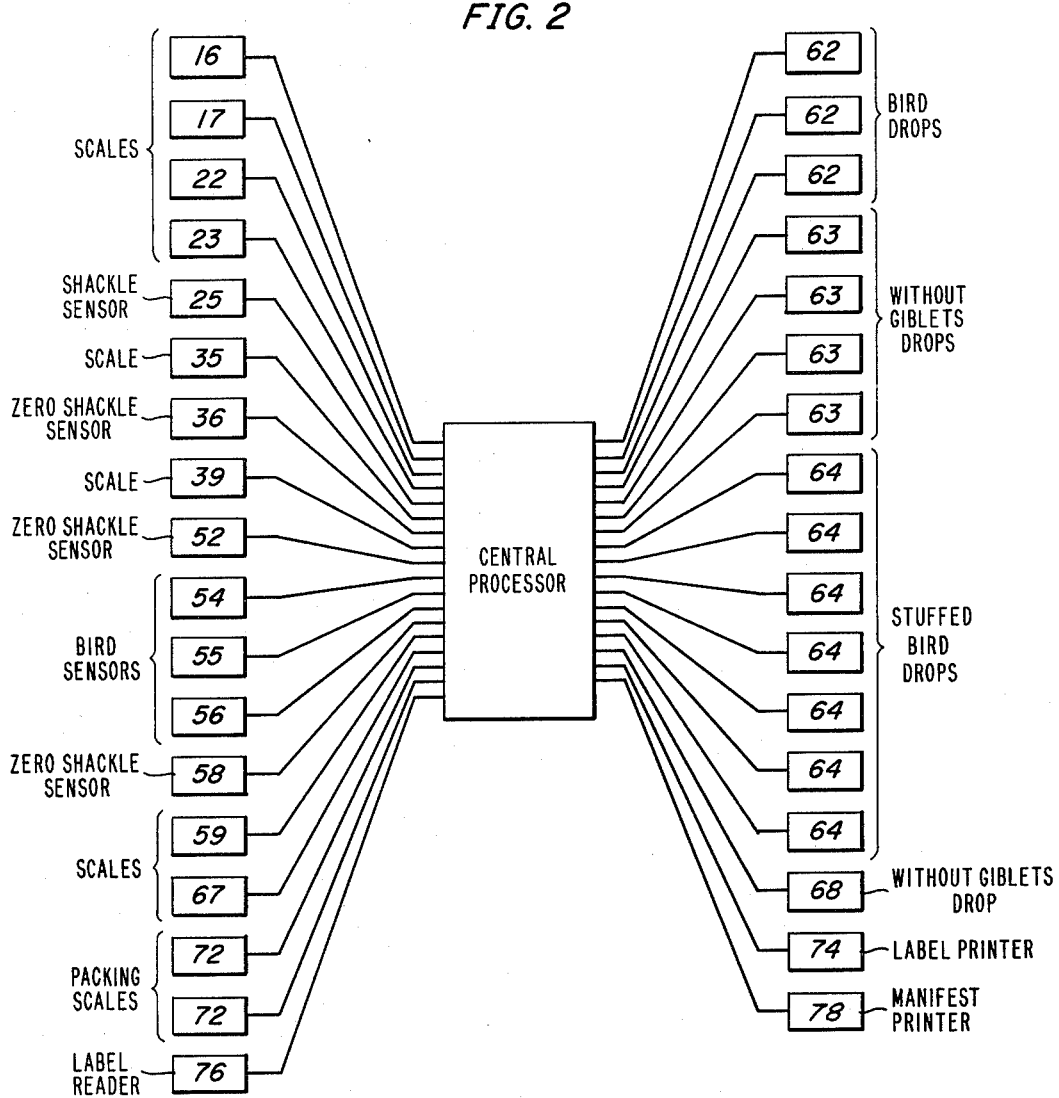
FIG. 2 is a schematic diagram showing the manner in which many of the processing steps can be automatically carried out or monitored.

The weight measurements made by the weighing scales 16, 17, 22 and 23 are recorded in any suitable manner so as to provide a record of the actual weight of birds delivered by each truck as well as the weight of dead birds delivered. Preferably, these scales are of the electronic type scales which are connected as shown in FIG. 2 and described hereinafter to a central processor.

The overhead conveyor 20 travels in a generally clockwise direction as viewed in FIG. 1 and carries the suspended birds through a sensing station 25 which senses each shackle and also senses whether a bird is suspended from each shackle. As explained more fully hereinafter in connection with FIG. 2, the station 25 provides an accurate count of the number of birds being processed.

After passing through the sensing station 25 the birds are carried by the conveyor 20 to a stunning station 27 where they are stunned by means of an electric shock or other conventional means and then carried through a slitter station 28 where the birds are slit and bled. The bled birds are then immersed in scalding water contained in an elongated tank 29 and after traveling through the tank the birds are carried through a conventional picker 30 which removes the feathers from the birds. The defeathered birds are then carried through a conventional hock cutter 31 where the hocks are automatically cut off and the birds then fall by gravity from the shackles onto a loading platform 32 for the eviscerating line. The empty shackles then return to the hanging station 18 for receiving other live birds.

The birds are than taken manually from the platform 32 and hung by their knuckles on eviscerating shackles suspended from a second overhead conveyor 33 which, a shown in FIG. 1, travels in a generally clockwise direction. After leaving the eviscerating loading station the birds pass over a weighing scaie 35 where they are individually weighed. One of the eviscerating shackles carries a flag or is otherwise different from all of the other shackles, and it is detected by a "zero shackle" sensor 36 located upstream of the scale 35. The outputs from the scale 35 and the detector 36 are connected to a central processor wherefor each bird, its weight and the particular shackle on which it is hung is recorded.

The birds then travel through the eviscerating area 28 and subsequently pass over a weighing scale 39 which weighs each bird. The weight of each bird and the shackle from which it is hung is recorded. Thus the weight loss of each bird passing through the eviscerating area is readily calculated from the weights of the same bird leaving and entering the eviscerating area. By also connecting the output of the scale 39 to the central processor this recording and calculating can be done almost instantly to sound an alarm or the like if, for example, the weight loss in the eviscerating area is larger than normal or if it is less than normal. It is important that either condition be promptly investigated and the problem corrected. Also, the weights of the birds leaving the eviscerating area are used by the central processor to select the orders to be filled when those birds will be delivered to the sorting station.

After leaving the scale 39 the birds are automatically dropped into a chiller 41. There is described in my copending application Ser. No. 06/227,140 filed Jan. 21, 1981. an automatic drop mechanism which may be used for dropping birds into the chiller. The chiller may be of the conventional type comprising an elongated tank filled with water maintained at a relatively low temperature of about 40° F. The birds are slowly moved through the tank at a rate such that the birds have a temperature of about 40° F. when they arrive at the exit end of the chiller. The birds are removed manually or automatically from the chiller and are inspected and graded for quality at a grading station 43. The station 43 is divided into a plurality of separate grade areas 44, 45, 46 and 47 respectively corresponding to the different grades of birds. While four such areas are shown, the actual number will vary from one plant to another.

An overhead conveyor 50, which travels in a clockwise direction travels over the grading station and carries a plurality of weighing shackles of a type, for example, described in my copending application Ser. No. 06/227,140 filed Jan. 21, 1981. As the shackles enter the grading station 43 they pass a zero shackle sensor 51 to identify each shackle entering the grading station. Also, between the respective grade areas there are located a plurality of bird sensors 54, 55 and 56. These sensors are also connected to the central processor. Accordingly, if the shackle following the zero shackle passes the sensor 54 without a bird but has a bird when it passes the sensor 55, a record is made of the fact that the number one shackle is carrying a grade 4 bird. In this manner the grade of bird, if any, on each shackle is determined and recorded by the central processor.

After leaving the grading station the birds are carried by the conveyor 50 past a "zero" shackle sensor 58 and across a weighing scale 59 where the weight of each bird, without giblets, called a WOG, is measured and recorded relative to the shackle carrying it. The birds then continue on to a cut-up drop station 62 where those birds which are to be cut-up are dropped from the conveyor. Preferably, an automatic drop mechanism under control of the central processor is located at the cut-up drop station and in response to a drop signal from the central processor causes the birds carried by selected shackles to be dropped. For examples, grade 4 birds may be seriously damaged and all shackles carrying grade 4 birds may be selected for dropping at the cut-up station 62. In addition all shackles carrying birds of any grade having weights outside a predetermined range may also be dropped at the cut-up station 62. It will be understood, however, that the particular sizes and grades of birds dropped at the cut-up station will depend on customer orders in house or antcipated and the number and types of birds delivered to the plant for processing.

The birds remaining on the conveyor 50 after passing the cut-up area are then carried through a series of WOG drop stations 63 and predetermined numbers of birds of desired grades and weights are released from the conveyor. The manner in which the birds are selected for dropping at the station 63 is essentially the same as used for selecting the birds to be dropped at stuffed bird drop stations 64 described hereinafter in connection with the stations 64. The birds are dropped in batches at each of the stations 63 so that the complete contents of a single package is dropped at each station. Those birds which remain on the conveyor 50 after passing the drop stations 63 are carried through a giblet stuffing station 66 where giblets which had been obtained from the eviscerating operation are packaged and inserted into the birds. They are then carried over a weighing scale 67 whereby the difference in the weight of the bird when it passed over the scale 59 and its weight when passing over the scale 67 indicates if the giblets were actually stuffed into the bird. By employing electronic scales and coupling the outputs thereof to the central processor this recording and computation can be done automatically. Accordingly the birds which do not contain giblets are not dropped at the stuffed bird drop station 64.

The birds then enter the group of stuffed bird drop stations 64 where they are selectively dropped for packing. The number of drop stations 64 is not critical but for purposes of explanation seven such stations identified in the drawing as A, B, C, D, E, F, and G are shown. In the event a bird leaving the giblet stuffing station 66 has not been stuffed with giblets it will pass completely through the station 64 and dropped at an unstuffed bird station 68. The empty shackles then return to the grading station 43 for receiving graded birds from the chiller 41.

Consider now the manner in which the birds are selected for automatic dropping at the various drop stations 64. Assume, for example, that a customer has ordered fifty boxes of twenty-five grade A birds weighing in the range of two and one-half to two and three quarter pounds and with the twenty-five birds in each box having a total weight within two ounces of sixty-five pounds. Drop locations 64A, 64B and 64C may be chosen for dropping the birds for this order. Accordingly shackles carrying grade A stuffed birds passing scale 67 and having weights within the required weight range will be selectively dropped at the locations 64A, 64B and 64C until twenty-five birds having the desired total weight of sixty-five pounds have been dropped at each location. A signal light at each station is then energized when the order at the associated station has been filled. This selection is best made by the central processor and the birds are dropped such that the stations are sequentially filled thereby giving the packers ample time to fill a box with one order before another order is dropped at the same location. Where desired a switch is provided at each drop station and must be actuated by the operator to reactivate the associated drop station once the order for that station has been filled. It will be understood that different orders will ordinarily be simultaneously filled at the other drop stations with the final station 64G receiving all of the stuffed birds which were not dropped at a preceding station.

In order to fill an order meeting the aforesaid requirements the first bird having the desired grade and within the desired weight range passing the scale 67 is dropped at station 64A. If the weight of this bird exceeds the median weight of the specified range, the next grade A bird passing the scale 67 and weighing less than the median weight of the range will be dropped at station 64A. If the average weights of the birds dropped at station A is less than the median weight of the specified range of the next grade A bird within the specified range but weighing more than the median weight will be dropped at station A. As a consequence, when twenty-five birds have been dropped in accordance with this procedure the total weight will be within one-half the weight range specified for each bird in the order of two ounces. Inasmuch as several different orders are simultaneously filled, substantially all of the birds will be dropped to fill these orders.

If the weights or grades of the birds being processed are such that an insufficient number of birds are available for filling the particular orders, where a central processor is used, the weight range and grade can be automatically modified so that similar though different types of birds may be used to fill the orders.

Figure 3:
FIG. 3 is an illustration of a type of label usable in the system of FIG. 1.

Either after the specified number of birds in the order for each station has been dropped or while the birds are still being dropped, a packer will remove the birds from the station and pack them in a box. When the order is filled and placed in a box, the packer then affixes a label pre-printed by a label printer 74 to the box and places the box on one of a plurality of conveyor belts 70 which carries the box across one of a plurality of packing weighing scales 72, past a label reader 76, through an icing station and then to a refrigerated storage area 75. The label, as shown in FIG. 3, will contain information pertaining to the contents of the box. In the assumed case, for example, it would indicate the total weight of sixty-five pounds and the number of birds. This same information plus customer name, location and other pertinent information will be contained in a universal product code also printed on the label. This code is read by the label reader 76 and enables an accurate determination of the ultimate location of each box. Similar information is provided for the boxes packed at the cut-up and WOG stations. Where desired a manifest printer 78 under control of the central processor may be provided for automatically printing the manifest for a particular order.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:
1. A method of selecting from a number of birds having random weights a predetermined number of birds each having a weight within a predetermined weight range, comprising the steps of
    individually weighing said birds,
    selecting a first bird weighing within said range, selecting a second bird weighing within said range and which weighs more than a predetermined reference weight within said range if the weight of said first bird is less than said reference weight or which is less than said predetermined reference weight if the weight of said first bird is more than said reference weight, selecting another bird weighing within said range and which weighs more than said reference weight if the average weight of the previously selected birds is less than said reference weight or which is less than said reference weight if the said averge weight is more than said reference weight, and repeating said last step until said predetermined number of birds have been selected.

2. A method according to claim 1 further comprising the step of placing said predetermined number of birds in a container, and applying to said container a printed label identifying the number of birds in said container, the weight range of said birds and the total weight of said birds.

3. A method of filling an order for a plurality of predetermined numbers of birds with each of said plurality being made up of birds within a predetermined weight range, comprising printing a number of labels equal to the number of said plurality, carrying out the method set forth in claim 1 for each of said plurality, placing each of said pluralities in a respective one of a plurality of containers, and respectively affixing said labels to said containers.

* * * * *